United States Patent
Martyn et al.

(10) Patent No.: US 10,179,861 B2
(45) Date of Patent: Jan. 15, 2019

(54) PRILLED COMPOUNDED THERMOPLASTIC ROADWAY MARKING MATERIALS

(71) Applicant: Ennis Paint, Inc., Thomasville, NC (US)

(72) Inventors: Glen Alan Martyn, La Verne, CA (US); Scott Nelson Coke, Anaheim, CA (US)

(73) Assignee: Ennis Paint, Inc., Thomasville, NC (US)

( * ) Notice: Subject to any disclaimer, the term of this patent is extended or adjusted under 35 U.S.C. 154(b) by 13 days.

(21) Appl. No.: 15/193,018

(22) Filed: Jun. 25, 2016

(65) Prior Publication Data

US 2017/0009080 A1    Jan. 12, 2017

Related U.S. Application Data

(60) Provisional application No. 62/189,747, filed on Jul. 8, 2015.

(51) Int. Cl.
| | |
|---|---|
| C09D 5/00 | (2006.01) |
| C09D 195/00 | (2006.01) |
| C08L 91/08 | (2006.01) |
| C08L 93/04 | (2006.01) |
| E01F 9/518 | (2016.01) |
| C09D 5/33 | (2006.01) |
| C09D 7/61 | (2018.01) |
| C08K 3/22 | (2006.01) |
| C08K 3/26 | (2006.01) |

(52) U.S. Cl.
CPC ............... C09D 5/004 (2013.01); C08K 3/22 (2013.01); C08K 3/26 (2013.01); C08L 91/08 (2013.01); C08L 93/04 (2013.01); C09D 7/61 (2018.01); C09D 195/00 (2013.01); E01F 9/518 (2016.02); C08K 2003/2241 (2013.01); C08K 2003/265 (2013.01)

(58) Field of Classification Search
CPC ....... C09D 5/004; C09D 195/00; C08L 91/08; C08L 93/04; E01F 9/518; C08K 2003/2241; C08K 2003/265
USPC .................................................... 106/31.04
See application file for complete search history.

(56) References Cited

U.S. PATENT DOCUMENTS

| | | | | |
|---|---|---|---|---|
| 3,679,626 A * | 7/1972 | Tanekusa et al. ...... | C09D 5/004 | 260/998.19 |
| 3,935,158 A * | 1/1976 | Watanabe ............. | C09D 5/004 | 260/998.19 |
| 5,128,203 A * | 7/1992 | Laroche ................ | C09D 5/004 | 206/568 |
| 5,750,191 A * | 5/1998 | Hachey ................. | E01F 9/524 | 427/163.4 |
| 5,972,421 A * | 10/1999 | Finley .................. | C09D 5/004 | 427/137 |
| 6,552,110 B1 * | 4/2003 | Yalvac ................. | C09D 5/004 | 523/172 |
| 7,771,635 B2 * | 8/2010 | Boothe ................ | B29B 9/065 | 165/177 |
| 9,732,480 B2 * | 8/2017 | Puffer, Sr. ........... | E01F 9/506 | |
| 9,771,492 B2 * | 9/2017 | Puffer ................. | C09D 5/004 | |
| 2004/0099212 A1 * | 5/2004 | Dirienzo .............. | E01C 23/20 | 118/108 |
| 2007/0059441 A1 * | 3/2007 | Greer .................. | E01F 9/512 | 427/136 |
| 2010/0226717 A1 * | 9/2010 | Bjorklund ............ | E01F 9/518 | 404/16 |
| 2014/0272331 A1 * | 9/2014 | Teng .................... | E01F 9/041 | 428/200 |

OTHER PUBLICATIONS

International Search Report for PCT/US 2016/039458, dated Sep. 9, 2016; 2 pages.*
Written Opinion for PCT/US 2016/039458, dated Sep. 9, 2016; 8 pages.*
Particle Size Conversion Table from Sigma-Aldrich; https://www.sigmaaldrich.com/chemistry/stockroom-reagents/learning-center/technical-library/particle-size-conversion.html; no date available; 2 pages.*

* cited by examiner

*Primary Examiner* — Helene Klemanski
(74) *Attorney, Agent, or Firm* — Kilpatrick Townsend & Stockton LLP

(57) ABSTRACT

This invention provides a convenient method of forming and applying a thermoplastic material for roadway markings, comprising: obtaining individual components of a thermoplastic composite material suitable for roadway markings; mixing and heating the individual components to produce a fully compounded form of the thermoplastic composite material; solidifying and prilling the fully compounded form of the thermoplastic composite material to produce a plurality of thermoplastic prills; on a marking vehicle or mobile apparatus, introducing the thermoplastic prills to an on-board melter to produce a liquid phase of the thermoplastic prills; and applying the liquid phase of the thermoplastic prills to a roadway, thereby marking the roadway. Compositions and systems are also described. Surprisingly, prills melt in approximately half the time as the powder/granular form. Also, the melter can be operated at lower temperature, leading to less discoloration of material.

18 Claims, No Drawings

PRILLED COMPOUNDED THERMOPLASTIC ROADWAY MARKING MATERIALS

PRIORITY DATA

This patent application is a non-provisional application claiming priority to U.S. Provisional Patent App. No. 62/189,747, filed on Jul. 8, 2015, which is hereby incorporated by reference herein.

FIELD OF THE INVENTION

The present invention generally relates to traffic marking materials, and methods and systems for making and using traffic marking materials.

BACKGROUND OF THE INVENTION

For at least four decades, a thermoplastic-like material has been in use to mark stripes and symbols on roadways. A typical composition is (by weight): calcium carbonate 30-50%, reflective glass beads 30-50%, maleic-modified glycerol rosin ester 10-25%, rosin ester 1-9%, paraffinic wax 1-5%, and titanium dioxide 1-3%. See for example U.S. Pat. No. 3,679,626 to Tanekusa et al.

The most common practice currently is the supply of material in a pre-mixed, uncompounded powder/granular form, sealed in plastic bags weighing about 22 kg each. Typically, an operator loads the bags into an on-board melt kettle by hand. By heating to over 200° C. and stirring, the powder fuses and melts into a compounded liquid. The melted liquid requires continuous stirring to suspend the reflective glass beads prior to pumping and application to the roadway surface.

There are several problems associated with the current uncompounded powder:
1. The powder is dusty and has a tendency to settle out, causing the mixture to become non-uniform.
2. Shipping and handling leads to broken bags.
3. It is impractical to convey or ship the material in bulk non-bagged form.
4. The material has limited shelf life.

Alternatively, material has been delivered in pre-melted, compounded blocks that alleviate some of the problems encountered with powder. This method has been widely abandoned because the blocks require more time to melt than the powder/granular form. Also, the blocks have been found to interfere with the melt kettle stirring mechanism.

Improvements are desired for the supply of material, and for application of the material on roadways.

SUMMARY OF THE INVENTION

In some variations, the invention provides a thermoplastic prill for roadway marking, the prill comprising, in fully compounded form, about 30-50 wt % calcium carbonate, about 30-50 wt % reflective glass beads, about 10-25 wt % maleic-modified glycerol rosin ester, about 1-9 wt % rosin ester, about 1-5 wt % paraffinic wax, and about 1-3 wt % titanium dioxide.

In some embodiments, the prill is in the form of a spherical pellet with average diameter of at least about 1 millimeter. In some embodiments, the prill is in the form of a cylinder or rod with average diameter of at least about 1 millimeter. The prill may also be a random shape with average effective diameter of at least about 1 millimeter, for example. The average diameter (or average effective diameter) may be at least about 3 millimeters or at least about 6 millimeters. Preferable, the prill is substantially free of dust.

In some embodiments, the prill is characterized by a melting time of about 40 minutes, 30 minutes, 20 minutes, or less, at a temperature of about 200° C., for example.

Other variations provide a method of forming and applying a thermoplastic material for roadway markings, the method comprising:
(a) obtaining individual components of a thermoplastic composite material suitable for roadway markings;
(b) mixing and heating the individual components to produce a fully compounded form of the thermoplastic composite material;
(c) solidifying and prilling the fully compounded form of the thermoplastic composite material to produce a plurality of thermoplastic prills;
(d) on a marking vehicle or mobile apparatus, remotely from step (c), introducing the thermoplastic prills to an on-board melter to produce a liquid phase of the thermoplastic prills; and
(e) applying the liquid phase of the thermoplastic prills to a roadway (or other substrate), thereby marking the roadway (or other substrate).

In some embodiments, the individual components of a thermoplastic composite material include calcium carbonate, reflective glass beads, maleic-modified glycerol rosin ester, rosin ester, paraffinic wax, and titanium dioxide. For example, the thermoplastic composite material may comprise about 30-50 wt % calcium carbonate, about 30-50 wt % reflective glass beads, about 10-25 wt % maleic-modified glycerol rosin ester, about 1-9 wt % rosin ester, about 1-5 wt % paraffinic wax, and about 1-3 wt % titanium dioxide.

In some embodiments, the prill is in the form of a spherical pellet with average diameter of at least about 1 millimeter, and substantially free of dust.

Step (d) may be automated. In some embodiments, step (d) utilizes a melting time of about 40 minutes, 30 minutes, 20 minutes, or less at a temperature of about 200° C. In certain embodiments, the melting time in step (d) is half, or less, of the melting time associated with the individual components that are not in the fully compounded form. In some embodiments, in step (d), the on-board melter is operated at a maximum melter temperature of about 190° C. or less, about 175° C. or less, or about 150° C. or less.

The present invention also provides systems. A system for the application of a thermoplastic material for roadway markings comprises:
(a) a compounding unit or zone for mixing and heating individual components of a thermoplastic composite material suitable for roadway markings to produce a fully compounded, melted form of the thermoplastic composite material;
(b) a prilling unit or zone for solidifying and prilling the fully compounded, melted form of the thermoplastic composite material to produce a plurality of thermoplastic prills; and
(c) a marking vehicle or mobile apparatus comprising an on-board melter, for introducing the thermoplastic prills to the on-board melter to produce a liquid phase derived from the thermoplastic prills, wherein the liquid phase is suitable for application onto a roadway.

In some embodiments, the on-board melter is automated. The on-board melter utilizes a melting time of about 40 minutes, 30 minutes, or 20 minutes, or less at a temperature of about 200° C., in various embodiments of the invention.

The on-board melter may be operated at a maximum melter temperature of about 190° C. or less, about 175° C. or less, or about 150° C. or less.

In some systems, the compounding unit or zone is an extruder. In some systems, the prilling unit or zone is an underwater pelletizer.

DETAILED DESCRIPTION OF EMBODIMENTS OF THE INVENTION

The compositions, methods, and systems of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing parameters, conditions, results, and so forth used in the specification and claims are to be understood as being modified in all instances by the term "about." Accordingly, unless indicated to the contrary, the numbers set forth in the following specification and attached claims are approximations that may vary depending upon specific algorithms and calculations.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

As intended herein, a "prill" is a small aggregate or globule of a material, such as a dry sphere, rod, pellet, tablet, coin, square, cylinder, or another effective form of the material, formed from (or derived from) a melted liquid. An "effective form" of the material means that some or all of the advantages described below are realized, noting that large blocks are not effective and therefore are not prills within the scope of this invention. "Prilled" is an adjective that refers to a product that has been formed into one or more prills. "Prilling" is a verb that refers to a process of forming prills.

As intended herein, "roadway" should be broadly construed to include any possible surface or substrate onto which any of the materials or compositions described herein are applied or may be applied. In preferred embodiments, a roadway is a road (such as a street, highway, or freeway) intended for the transport of cars, trucks, motorcycles, and the like.

Glass beads provide the retroreflectivity necessary for its bright night time appearance. Pigments may be added to provide color and opacity. A binder is typically present, as a mixture of plasticizer and resins that provide toughness, flexibility, and bond strength while holding all the components together. Fillers, such as calcium carbonate, sand and/or other inert substances provide bulk.

In certain variations, the invention provides a thermoplastic prill for roadway marking, the prill comprising, in fully compounded form, about 30-50 wt % calcium carbonate, about 30-50 wt % reflective glass beads, about 10-25 wt % maleic-modified glycerol rosin ester, about 1-9 wt % rosin ester, about 1-5 wt % paraffinic wax, and about 1-3 wt % titanium dioxide.

Some variations of the present invention are premised on the discovery that by pre-melting all materials in a thermoplastic composition into a fully blended liquid state, such as at 150-200° C., and then dispensing the liquid state into small globules that solidify to form small prills, such as approximately 3-9 mm in diameter, many improvements result. Prills reduce dust in production and for the end user. Additionally, shipping and transportation of bagged powder is cumbersome and problematic. Prills accommodate bulk transfer techniques previously developed by other industries.

The thermoplastic composition, when converted to prill form, has the following advantages:
1. Dust is eliminated.
2. Bulk transfer techniques can be utilized.
3. Automated filling of melter becomes practical.
4. Improved or unlimited shelf life is realized.
5. No interference with melt kettle stirring operation is experienced.
6. Prills melt in approximately half the time as powder/granular form. This is unexpected, because the particle size of powder is typically less than the particle size of prills, and melting time is usually faster with smaller particles (shorter heat-transfer distances).
7. A melter can surprisingly be operated at lower temperature, resulting in less scorching that would cause discoloration of material.

In some embodiments, the prill is in the form of a spherical pellet with average diameter of at least about 1 millimeter. In some embodiments, the prill is in the form of a cylinder or rod with average diameter of at least about 1 millimeter and/or an average length of at least about 1 millimeter. In some embodiments, the prill is in the form of a tablet with average diameter of at least about 1 millimeter and/or an average length of at least about 1 millimeter. In some embodiments, the prill is in the form of a coin with average diameter of at least about 1 millimeter and/or an average thickness of at least about 1 millimeter. In some embodiments, the prill is in the form of a square with average length of at least about 1 millimeter and/or an average thickness of at least about 1 millimeter. The prill may also be a random shape with average effective diameter of at least about 1 millimeter, for example.

For any of the above geometries, or others, the average minimum length scale may be about 1, 2, 3, 4, 5, 6, 7, 8, 9, or 10 millimeters, or more, such as about 15, 25, 50, 75, or 100 millimeters. In these or other embodiments, the average maximum length scale may be about 1, 2, 3, 4, 5, 6, 7, 8, 9, or 10 millimeters, or more, such as about 15, 25, 50, 75, or 100 millimeters. An example is a cylinder, in which the diameter is the minimum length scale and the length (or height) is the maximum length scale.

When the minimum length scale is a diameter, the average diameter (or average effective diameter) may be at least about 1, 2, 3, 4, 5, 6, 7, 8, 9, or 10 millimeters, for example. In certain embodiments, the minimum length scale is selected from about 1 millimeter to about 9 millimeters, such as about 3 millimeters to about 6 millimeters.

When the maximum length scale is a diameter, the average diameter (or average effective diameter) may be at least about 1, 2, 3, 4, 5, 6, 7, 8, 9, or 10 millimeters, for example. In certain embodiments, the maximum length scale is selected from about 1 millimeter to about 9 millimeters, such as about 3 millimeters to about 6 millimeters.

When the minimum length scale is a thickness (such as, for example, the thickness of a coin-shaped prill), the average thickness may be from about 0.1 millimeters to about 5 millimeters, for example.

When the maximum length scale is a thickness (such as, for example, the thickness of a coin-shaped prill), the average thickness may be from about 1 millimeter to about 10 millimeters, for example.

Preferably, the prill is substantially free of dust (e.g., particles of the thermoplastic composition with an average particle size less than 0.1 millimeters). This can be accomplished by pre-melting all materials in a thermoplastic composition into a fully blended liquid state, and then dispensing the liquid state into small globules that solidify to form small prills. Note that environmental dust and dirt, while generally undesired, may be present unintentionally in or around the prills.

In some embodiments, the prill is characterized by a melting time of about 1 hour, 50 minutes, 40 minutes, 30 minutes, 20 minutes, 10 minutes, or less (including all intermediate melting times in increments of 1 minute), at a temperature of about 200° C.

In some embodiments, the prill is characterized by a melting time of about 1 hour, 50 minutes, 40 minutes, 30 minutes, 20 minutes, 10 minutes, or less (including all intermediate melting times in increments of 1 minute), at a temperature of about 190° C.

In some embodiments, the prill is characterized by a melting time of about 1 hour, 50 minutes, 40 minutes, 30 minutes, 20 minutes, 10 minutes, or less (including all intermediate melting times in increments of 1 minute), at a temperature of about 180° C.

In some embodiments, the prill is characterized by a melting time of about 1 hour, 50 minutes, 40 minutes, 30 minutes, 20 minutes, 10 minutes, or less (including all intermediate melting times in increments of 1 minute), at a temperature of about 170° C.

In some embodiments, the prill is characterized by a melting time of about 1 hour, 50 minutes, 40 minutes, 30 minutes, 20 minutes, 10 minutes, or less (including all intermediate melting times in increments of 1 minute), at a temperature of about 160° C.

In some embodiments, the prill is characterized by a melting time of about 1 hour, 50 minutes, 40 minutes, 30 minutes, 20 minutes, 10 minutes, or less (including all intermediate melting times in increments of 1 minute), at a temperature of about 150° C.

Other variations provide a method of forming and applying a thermoplastic material for roadway markings, the method comprising:

(a) obtaining individual components of a thermoplastic composite material suitable for roadway markings;
(b) mixing and heating the individual components to produce a fully compounded form of the thermoplastic composite material;
(c) solidifying and prilling the fully compounded form of the thermoplastic composite material to produce a plurality of thermoplastic prills;
(d) on a marking vehicle or mobile apparatus, remotely from step (c), introducing the thermoplastic prills to an on-board melter to produce a liquid phase of the thermoplastic prills; and
(e) applying the liquid phase of the thermoplastic prills to a roadway, thereby marking the roadway.

A "mobile apparatus" means an apparatus that includes at least an on-board melter (e.g., heater) to produce a liquid phase of the thermoplastic prills, wherein the apparatus is itself directly mobile (transportable on a roadway) or is disposed on an overall system to render the apparatus effectively mobile.

In some embodiments, the individual components of a thermoplastic composite material include calcium carbonate, reflective glass beads, maleic-modified glycerol rosin ester, rosin ester, paraffinic wax, and titanium dioxide. For example, the thermoplastic composite material may comprise about 30-50 wt % calcium carbonate, about 30-50 wt % reflective glass beads, about 10-25 wt % maleic-modified glycerol rosin ester, about 1-9 wt % rosin ester, about 1-5 wt % paraffinic wax, and about 1-3 wt % titanium dioxide. These are exemplary compositions only, and it will be recognized by a person having skill in the art that many other compositions may be utilized.

In certain embodiments, the prill is in the form of a spherical pellet with average diameter of at least about 1 millimeter, and substantially free of dust.

Step (d) may be automated. In some embodiments, step (d) utilizes a melting time of about 30 minutes or less at a temperature of about 200° C. In certain embodiments, the melting time in step (d) is half, or less (e.g., about 50%, 40%, 30%, 20%, or 10%), of the melting time associated with the individual components when they are not in the fully compounded form. In some embodiments, in step (d), the on-board melter is operated at a maximum melter temperature of about 200° C., 195° C., 190° C., 185° C., 180° C., 175° C., 170° C., 165° C., 160° C., 155° C., 150° C. or less.

The present invention also provides systems. A system for the application of a thermoplastic material for roadway markings comprises:

(a) a compounding unit or zone for mixing and heating individual components of a thermoplastic composite material suitable for roadway markings to produce a fully compounded form of the thermoplastic composite material;
(b) a prilling unit or zone for solidifying and prilling the fully compounded form of the thermoplastic composite material to produce a plurality of thermoplastic prills; and
(c) a marking vehicle or mobile apparatus comprising an on-board melter, for introducing the thermoplastic prills to the on-board melter to produce a liquid phase of the thermoplastic prills, wherein the liquid phase is suitable for application onto a roadway.

In some embodiments, the on-board melter is automated. The on-board melter utilizes a melting time of about 40 minutes, 30 minutes, or 20 minutes or less at a temperature of about 200° C., in various embodiments of the invention. The on-board melter may be operated at a maximum melter temperature of about 190° C. or less, about 175° C. or less, or about 150° C. or less, for example.

In some systems, the compounding unit or zone is an extruder. In some systems, the prilling unit or zone is an underwater pelletizer. Conventional polymer processing may be utilized to manufacture the prills. For example, an extruder configured with an underwater pelletizer, such as those made by Gala Industries, may be employed. Any other known polymer-processing and compounding unit operations may be employed, in various embodiments of the invention.

There are various devices used to screed/extrude thermoplastic material onto a roadway. Ribbon dispensers are heated and suspended above the road surface, applying a forced-extrusion, well-defined thermoplastic line. Spray dispensing devices use a thermoplastic spray pattern resulting in a uniformly thick, well-defined and securely-bonded stripe. Screed extrusion devices employ dispensing shoe rides directly on the road surface and a continuous line is formed by a three-sided die with a control gate set to a pre-determined thickness.

Hot applied thermoplastic is typically prepared for road application in a melting kettle where prills are introduced and heated until they liquefy. Melted thermoplastic (which is optionally agitated) is transferred into a screed, ribbon or spray device where it is then shaped into its specified width and thickness as a line, legend, or symbol.

When applied on asphaltic surfaces, thermoplastic materials develop a thermal bond via heat-fusion. The thermoplastic melts into the upper surface of the asphalt, forming a thermal bond. When applied on Portland concrete and on oxidized or aged asphaltic surfaces, a sealer may be also applied.

When installed on porous surfaces, such as open-graded asphalt or tined concrete, the hot liquid thermoplastic fills all voids, creating a good mechanical lock on concrete. Thickness of the applied thermoplastic may be specified. In some embodiments, a minimum thickness of 50-100 mils is important to the material's ability to hold the heat necessary for good bonding. The thermal bonding that occurs when application is at the proper thickness ensures the thermoplastic's durability and long-term retroreflectivity.

Being raised above the road surface, combined with the retroreflectivity produced by the glass beads, makes thermoplastic more visible from a distance and at night. The thickness also contributes to improved retroreflective performance in wet conditions.

The melting kettle(s) must be capable of heating thermoplastic material to its application temperature evenly, without scorching. The heating mechanism of the kettle may employ a heat-transfer medium consisting of hot oil, hot air, steam, or electrical heating. A temperature gauge should be present on the outside of the kettle to indicate the temperature of the thermoplastic material. The kettle is preferably capable of thoroughly mixing the material at a rate which will ensure even disbursement and uniform temperatures throughout the material mass.

EXAMPLE

A simple test comparing melting times in a small industrial melter, typical of those used at job sites, was performed. The prills were made by stirring and melting thermoplastic composition powder at 190° C. and pouring the melted powder into a pan to form sheets about 3 mm thick. The sheets were then broken into small square prills, about 6 mm on each side of the squares.

With a melt kettle set to identical conditions, the melting time results were as follows: 45 minutes for 22 kg powder; 20 minutes for 22 kg prills.

In this detailed description, reference has been made to multiple exemplary embodiments of the invention. These embodiments are described to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims. In the case of conflict in definitions between the present disclosure and a dictionary or other reference, the present disclosure will be controlling.

What is claimed is:

1. A thermoplastic prill for roadway marking, said prill comprising, in fully compounded form, about 30-50 wt % calcium carbonate, about 30-50 wt % reflective glass beads, about 10-25 wt % maleic-modified glycerol rosin ester, about 1-9 wt % rosin ester, about 1-5 wt % paraffinic wax, and about 1-3 wt % titanium dioxide, wherein said prill is characterized by an average maximum length scale of at least about 1 millimeter.

2. The thermoplastic prill of claim 1, wherein said prill is in a form selected from the group consisting of pellets, spheres, cylinders, rods, squares, tablets, and coins.

3. The thermoplastic prill of claim 1, wherein said average maximum length scale is less than 10 millimeters.

4. The thermoplastic prill of claim 1, wherein said prill is substantially free of dust.

5. The thermoplastic prill of claim 1, wherein said prill is characterized by a melting time of about 40 minutes or less at a temperature of about 200° C.

6. A method of forming and applying a thermoplastic material for roadway markings, said method comprising:
   (a) obtaining individual components of a thermoplastic composite material suitable for roadway markings;
   (b) mixing and heating said individual components to produce a fully compounded form of said thermoplastic composite material;
   (c) solidifying and prilling said fully compounded form of said thermoplastic composite material to produce a plurality of thermoplastic prills;
   (d) on a marking vehicle or mobile apparatus, remotely from step (c), introducing said thermoplastic prills to an on-board melter to produce a liquid phase of said thermoplastic prills, wherein step (d) utilizes a melting time of about 40 minutes or less and a melting temperature of about 200° C. or less to produce a liquid phase of said thermoplastic prills; and (e) applying said liquid phase of said thermoplastic prills to a roadway, thereby marking said roadway.

7. The method of claim 6, wherein said individual components of a thermoplastic composite material include calcium carbonate, reflective glass beads, maleic-modified glycerol rosin ester, rosin ester, paraffinic wax, and titanium dioxide.

8. The method of claim 7, wherein said thermoplastic composite material comprises about 30-50 wt % calcium carbonate, about 30-50 wt % reflective glass beads, about 10-25 wt % maleic-modified glycerol rosin ester, about 1-9 wt % rosin ester, about 1-5 wt % paraffinic wax, and about 1-3 wt % titanium dioxide.

9. The method of claim 6, wherein said thermoplastic prills are in a form selected from the group consisting of pellets, spheres, cylinders, rods, squares, tablets, and coins.

10. The method of claim 6, wherein said thermoplastic prills are characterized by an average maximum length scale from about 1 millimeter to about 10 millimeters.

11. The method of claim 6, wherein said thermoplastic prills are substantially free of dust.

12. The method of claim 6, wherein step (d) is automated.

13. A system for application of a thermoplastic material for roadway markings, said system comprising:

(a) a compounding unit or zone for mixing and heating individual components of a thermoplastic composite material suitable for roadway markings to produce a fully compounded form of said thermoplastic composite material;

(b) a prilling unit or zone for solidifying and prilling said fully compounded form of said thermoplastic composite material to produce a plurality of thermoplastic prills, wherein said plurality of thermoplastic prills is characterized by an average maximum length scale from about 1 millimeter to about 10 millimeters; and (c) a marking vehicle or mobile apparatus comprising an on-board melter, for introducing said thermoplastic prills to said on-board melter to produce a liquid phase of said thermoplastic prills, wherein said liquid phase is suitable for application onto a roadway.

14. The system of claim 13, wherein said on-board melter is automated.

15. The system of claim 14, wherein said on-board melter is configured such that melting time is controlled at about 40 minutes or less, and melting temperature is controlled at about 200° C. or less.

16. The system of claim 13, wherein said compounding unit or zone, as well as said prilling unit or zone, are each physically isolated from said marking vehicle or mobile apparatus.

17. The system of claim 13, wherein said compounding unit or zone is an extruder.

18. The system of claim 13, wherein said prilling unit or zone is an underwater pelletizer.

* * * * *